United States Patent [19]

Lustig et al.

[11] Patent Number: 4,863,784
[45] Date of Patent: Sep. 5, 1989

[54] MULTILAYER FILM CONTAINING VERY LOW DENSITY POLYETHYLENE

[75] Inventors: Stanley Lustig, Park Forest; Jeffrey M. Schuetz, Woodridge, both of Ill.

[73] Assignee: Viskase Corporation, Chicago, Ill.

[21] Appl. No.: 54,918

[22] Filed: May 28, 1987

[51] Int. Cl.$^4$ .................. B32B 27/08; B65D 81/34
[52] U.S. Cl. ................................. 428/218; 428/349; 428/516; 428/518; 428/520; 428/910; 428/34.9; 426/127; 426/412; 426/129; 427/42
[58] Field of Search ............... 428/218, 516, 520, 518, 428/349, 910

[56] References Cited

U.S. PATENT DOCUMENTS

| | | | |
|---|---|---|---|
| 3,456,044 | 7/1969 | Pahlke | 264/25 |
| 3,741,253 | 6/1973 | Brax et al. | 138/137 |
| 4,448,792 | 5/1984 | Shirmer | 426/113 |
| 4,456,646 | 6/1984 | Nishimoto et al. | 428/216 |
| 4,640,856 | 2/1987 | Ferguson et al. | 428/36 |
| 4,643,928 | 2/1987 | Kimura et al. | 428/36 |

FOREIGN PATENT DOCUMENTS 0202814  11/1986  European Pat. Off. .
0204918  12/1986  European Pat. Off. .

*Primary Examiner*—P. C. Ives
*Attorney, Agent, or Firm*—John C. LeFever

[57] ABSTRACT

A coextruded, heat shrinkable, thermoplastic multilayer film for packaging fresh red meat cuts and processed meats. The film comprises a first layer comprising very low density polyethylene, a first core layer of vinylidene chloride-methyl acrylate copolymer, and a second layer comprising very low density polyethylene. In another embodiment the first layer is a second core layer confined between said first core layer and a first outer layer comprising a heat sealable thermoplastic polymer or copolymer. In a further embodiment the second layer is a second core layer confined between said first core layer and a second outer layer comprising a thermoplastic polymer or copolymer.

44 Claims, No Drawings

MULTILAYER FILM CONTAINING VERY LOW DENSITY POLYETHYLENE

FIELD OF THE INVENTION

This invention relates to a coextruded, heat shrinkable, thermoplastic multilayer film suitable for use in the manufacture of bags for packaging fresh red meats and processed meats. In particular, this invention relates to a coextruded heat shrinkable multilayer film having a first outer layer of very low density polyethylene, a core layer of vinylidene chloride-methyl acrylate copolymer, and a second outer layer of very low density polyethylene.

BACKGROUND OF THE INVENTION

The meat packing industry may be commonly divided into three segments. They are fresh meats, frozen meats and processed meats. This invention relates to fresh red meats, such as beef and pork, which is distinct from fresh white meat, such as poultry. This invention also relates to processed meats.

In the Fresh Meat Industry, the cattle and swine are slaughtered and broken down into primal and subprimal meat cuts. The primal and subprimal meat cuts are large cuts of meat. They are smaller than a side of beef, for example, but larger than the ultimate cut which is sold at retail to the consumer. A primal cut comprises the entire section of a side of beef, such as the rib section or the rump roast section, while a subprimal cut comprises only a portion of such a section. Primal and subprimal cuts are prepared at the slaughter house and are then shipped to a retail meat store, or to an institution such as a hospital, hotel or restaurant, where they are butchered into small cuts of meat suitable for the individual consumer.

The Processed Meat Industry takes various portions of the animal carcasses and processes these portions under varying conditions to produce finished meat products which may be used directly by the consumer. Products may include ham, smoked picnics, smoked butts, corned beef, turkey breast, and various sausage products such as frankfurters, smoked sausage links, bologna, salami, and the like. These products may be packaged in consumer portions or they may be packaged in bulk for shipment to a retail meat store, restaurant or hotel. Bulk shipments may include such items as ham chunks, cooked turkey breasts, bologna chubs, long bologna for delicatessen sale, rings of bologna, corned beef brisket, smoked picnics, smoked butts and linked products such as smoked sausage.

When fresh red meat cuts, such as roast or rib sections, and bulk processed meats are prepared for shipment or storage, they are usually packaged in such a way that air (i.e., oxygen) is prevented from contacting the meat and moisture is prevented from leaving the meat. This is done in order to minimize spoilage and discoloration during shipping and handling. One desirable way to package fresh red meats and processed meats so as to protect them from contact with air and from moisture loss is to shrink package them with a packaging material that has good oxygen and moisture vapor barrier properties. One such shrink packaging material that has good oxygen and moisture vapor barrier properties is polyvinylidene chloride film. Vinylidene chloride-vinyl chloride copolymers are commonly referred to as PVDC.

While vinylidene chloride-vinyl chloride copolymer film has excellent barrier properties, in actual practice, when PVDC is used as a monolayer film, it must be plasticized in order for the film to have adequate abrasion resistance and flexibility at storage temperatures of, for example, 30° to 50° F. Unfortunately, the addition of plasticizer sufficient to provide the requisite low temperature properties to the PVDC monolayer film has a significant adverse effect on the barrier properties of the film. While increasing the thickness of the film from the conventional thickness of 1.5 to 2.0 mils, to 5 mils or more, for instance, would improve the barrier properties of the film, it would be economically undesirable to use a monolayer film of PVDC having a thickness of 5 or more mils. Also, if such thick films were employed, bags made from the film would be difficult to gather and clip closed at the open end.

One approach to the provision of a film having barrier properties which are better than those of the 1.5 to 2.0 mil monolayer PVDC film previously used for shrink packaging meat, is to employ a multilayer film, one layer of which is vinylidene chloride-vinyl chloride copolymer having a minimum amount of plasticizer. The other layer or layers of such multilayer films are selected so as to provide the requisite low temperature properties and abrasion resistance which are lacking in the vinylidene chloride-vinyl chloride layer containing little or no plasticizer.

In providing such a film, however, it must be recognized that good oxygen and moisture vapor barrier properties, abrasion resistance, and low temperature properties are not the only requirements for a film that is to be used for shrink packaging processed meats and primal and subprimal meat cuts. The film must have been biaxially stretched in order to produce shrinkage characteristics sufficient for the film to heat-shrink within a specified range of percentages, e.g., from about 15 to 60 percent at about 90° C., in both the machine and the transverse directions. (Conventionally, the term "MD" refers to machine direction and the term "TD" refers to transverse direction.) The film must be heat sealable in order to be able to fabricate bags from the film and in order to heat seal the open ends of the fabricated bags after insertion of the meat product. The heat sealed seams of the bags must not pull apart during the heat shrinking operation, and the film must resist puncturing by sharp bone edges during the heat shrinking operation.

Also, there must be adequate adhesion between the several layers of the film so that delamination does not occur, either during the heat shrinking operation or during exposure of the film to the relatively high temperatures that may be reached during shipping and storage of the film in the summertime. Delamination is the phenomenon where layers of the multilayer film are readily separable or easily pulled apart from face to face integrity with no tearing of the individual layers of film.

In order to overcome problems of delamination, it is known in the prior art to use adhesive layers between layers which do not otherwise adhere to each other with the required bonding strength under normal conditions of commercial use. For example, polyethylene and polypropylene are known to have poor lamination characteristics when in face to face relationship with the oxygen barrier layers conventionally used in bags of multilayer films used for packaging primal or subprimal meat cuts of fresh red meat, and in bags for packaging processed meats. Adhesive layers are often used in compensation for such poor lamination characteristics.

By way of illustrating multilayer film containing adhesive layers, Shirmer U.S. Pat. No. 4,448,792 teaches a cook-in shrink bag fabricated from a multilayer film having a first heat sealing and food contacting layer composed of propylene homopolymer or copolymer; a second heat shrinkable layer composed of a blend of propylene homopolymer or copolymer and butylene homopolymer or copolymer; a third adhesive layer composed of irradiatively cross-linkable ethylene copolymer; a fourth oxygen barrier layer comprising vinylidene chloride copolymer; a fifth adhesive layer of irradiatively cross-linkable ethylene copolymer; and a sixth optical clarity layer comprising propylene homopolymer or copolymer; wherein the entire six layer film has been irradiated either before or after the multilayer film has been biaxially stretched. Among the several key benefits enumerated by Schirmer, the completely irradiated six layer film provides bags having structural integrity in that the bags resist delamination and their heat seals have high temperature resistance, while at the same time the bags are acceptable for food contact in terms of minimum levels of extractables. Cook-in bags made of this multilayer film will maintain seal integrity and will resist delamination when submerged in water at 80° C. for 12 hours.

While the use of adhesive layers, as taught in such prior art, is effective in avoiding problems of delamination, it is an undesirable solution. First of all, additional equipment is required, and the process becomes more complex with the need for new extruders and extrusion dies. Additionally, the addition of adhesive layers will generally make the film thicker. The production of a thicker film may be avoided, however, by reducing the thickness of the other film layers or by controlling the thickness of the adhesive layers so that they are very thin. Since the oxygen barrier layer thickness may not be reduced without the loss of barrier effectiveness, it becomes necessary to only reduce the thickness of the outer layers, and this can cause a reduction in heat sealability and/or a reduction in puncture resistance. Thus, it is preferred not to reduce the thickness of the outer film layers, but to control the adhesive layers to a minimum thickness which is effective in bonding the layers sufficiently to avoid delamination problems. This in turn requires sophisticated equipment, which is expensive, since the equipment must control the adhesive layer thickness generally to a range of from about 0.10 to about 0.15 mil. Moreover, the adhesives themselves are generally very expensive, and the cost of adhesive plus the cost of the new equipment generally causes an increase in the price of the bags produced from the multilayer film.

Thus, it is preferred to find a means for strongly bonding the other layers directly to the oxygen barrier layer without the use of prior art adhesive layers.

It should be noted that the aforementioned Shirmer U.S. Patent No. 4,448,792 teaches that both polypropylene and blends of propylene with another polymer require an adhesive layer in order to bond these layers acceptably to the oxygen barrier layer of vinylidene chloride copolymer. However, the prior art also teaches such a need for adhesive layers in regard to polyethylene.

Illustrative of a polyethylene, unblended with any other polymer, which requires an adhesive layer in order to acceptably bond to the oxygen barrier layer is U.S. Pat. No. 4,640,856 to Ferguson et.al. This patent discloses bags for the packaging of fresh red meat (primal and subprimal meat cuts), cheeses, poultry and other food and non-food products, wherein the bag is fabricated from a multilayer thermoplastic shrink film having a substrate layer of a very low density polyethylene which has been extrusion coated with at least a gas barrier layer comprising a copolymer of vinylidene chloride or a hydrolized ethylene vinyl acetate copolymer. This two layer film is then extrusion coated with another layer of a thermoplastic polymer to form at least a three layer film having a core layer of the gas barrier layer. Ferguson et.al. teach that an ethylene vinyl acetate layer should be interposed between the surface layer of very low density polyethylene and the gas barrier core layer of vinylidene chloride copolymer to promote adhesion between the layers and to lessen any tendency of the film to delaminate, since very low density polyethylene does not adhere to vinylidene chloride copolymers as well as the ethylene vinyl acetate does. Additionally, this patent teaches that for maximum delamination protection adhesive layers should be used to bond outer layers of very low density polyethylene to core layers of barrier film, both when the oxygen barrier layer is a copolymer of vinylidene chloride and when it is a hydrolyzed ethylene vinyl acetate.

Illustrative of a polyethylene blended with another polymer in one layer of a multilayer film, wherein an adhesive layer is required in order to acceptably bond the blend layer to the oxygen barrier layer, is U.S. Pat. No. 4,456,646 to Nishimoto et.al. This patent teaches that a multilayer film for the packaging of meats and cheeses may be fabricated of a core layer of a vinylidene chloride copolymer with outer layers of a blend of ethylene vinyl acetate and a linear low density polyethylene having a density of from 0.900 to 0.950 grams per cubic centimeter. Nishimoto et.al. teach that the linear low density polyethylene, which is a copolymer of ethylene with an alpha olefin having less than 18 carbon atoms, will not adhere to the core layer of vinylidene chloride copolymer so that the outer layers are apt to delaminate from the core layers, particularly in an elevated temperature environment. Accordingly, Nishimoto et.al. teach that it is necessary to provide an adhesive layer between the core layer of barrier film and each outer layer containing the blend of ethylene vinyl acetate and linear low density polyethylene.

We have found that not only are the multilayer film structures of Ferguson et.al. U.S. Pat. No. 4,640,856 undesirable from the standpoint of the adhesive layer requirements, but in fact, contrary to the teachings of Ferguson et.al., we have discovered that a first outer layer of very low density polyethylene will bond directly to a core layer of oxygen barrier film comprising a vinylidene chloride copolymer without the use of any adhesive layer interposed therebetween, if the multilayer film is a coextruded film. This matter will be discussed more fully hereinafter.

We have also found that not only are the polyethylene blends of Nishimoto et.al. U.S. Pat. No. 4,456,646 undesirable from the standpoint of the adhesive layer requirement, but they are also undesirable because they cause the optical properties of the film to be unacceptably degraded. Such polyethylene blends cause the haze value for the multilayer film to increase to an unacceptable level, and they cause the gloss value for the multilayer film to decrease to an unacceptable level.

The haze value is important because it is an indication of the ability of the film to transmit light. A low haze value indicates a very clear film which enables one to clearly see the contents of the package. We find that the haze value must not exceed 6.5% when packaging fresh red meat cuts and processed meats. This value is particularly important in regard to the packaging of processed meats, since it is the individual consumer who is viewing the package and deciding whether or not to make a purchase.

The gloss value is important because it is a measure of the shiny appearance of the film. A high gloss value indicates that the packaged meat product will have a very shiny highly attractive appearance. We find that the gloss value should not be below 70% when packaging fresh red meat cuts and processed meats. This value is particularly important in regard to the packaging of processed meats, since it is the individual consumer who is viewing the package at the point of purchase.

Another important consideration in evaluating multilayer films is the type and degree of film curl which the film exhibits. Film curl is an indication of the ease or the difficulty which is experienced in opening a bag which has been fabricated from the multilayer film. In order for a multilayer film to be commercially acceptable, the film must be capable of producing bags which are easily opened by the bagging operator who places the meat product into the bag on the production line of the meat packing plant. Bags which are difficult to open cause delays in the bagging operation and result in low production efficiency. The significance of film curl will be discussed more fully hereinafter.

In summary then, it is an object of the present invention to provide a multilayer film containing a core layer of an oxygen barrier and outer layers of polyethylene, wherein the outer layers are bonded directly to the core layer with no adhesive layers interposed therebetween.

It is another object of the present invention to provide such multilayer films, wherein the haze and gloss properties of the multilayer film are acceptable under conditions of commercial use.

It is a further object of the present invention to provide such multilayer films, wherein the films are capable of fabrication into bags which are easily openable under conditions of commercial use, as indicated by the curl properties of such multilayer films.

It is a still further object of the present invention to provide such multilayer films, wherein no adhesive layers are employed to bond the outer layers to the core layer, and wherein the outer layers provide improved strength characteristics and improved puncture resistance to the film.

SUMMARY OF THE INVENTION

The foregoing objectives of the present invention may be achieved by providing a coextruded, thermoplastic, heat shrinkable, multilayer film wherein, (a) said multilayer film comprises a first layer comprising very low density polyethylene, a core layer comprising vinylidene chloride-methyl acrylate copolymer, and a second layer comprising very low density polyethylene; and wherein, (b) said first layer is adhered directly to one side of said core layer and said second layer is adhered directly to the other side of said core layer. There is no adhesive material between the core layer and the first or second layer.

In the multilayer film of this invention, the copolymer of the core layer has a vinylidene chloride content of from about 85 to about 95 weight percent, and a methyl acrylate content of from about 5 to about 15 weight percent, all based on the weight of said copolymer.

In one preferred embodiment, the present invention provides this multilayer film wherein the first and second layers of very low density polyethylene are outer layers, and the core layer is confined between these outer layers to provide a three layer film.

In another preferred embodiment, the core layer of vinylidene chloride-methyl acrylate is a first core layer, and either the first layer or the second layer of very low density polyethylene is a second core layer confined between the first core layer and an outer layer of thermoplastic polymer or copolymer to provide a multilayer film having four or more layers.

In a further preferred embodiment, both the first layer and the second layer of very low density polyethylene are core layers confined between the core layer of vinylidene chloride-methyl acrylate copolymer and two outer layers of thermoplastic polymer or copolymer to provide a multilayer film having five or more layers.

Despite the foregoing teachings of the prior art, we have now discovered that multilayer films having a core layer of an oxygen barrier of vinylidene chloride-methyl acrylate copolymer may contain layers of very low density polyethylene which are bonded directly to the core layer without the use of interposed adhesive layers. Further, we have discovered that the multilayer films of this invention will not have increased haze or diminished gloss in comparison to prior art multilayer films currently in commercial use. Additionally, we have found that the multilayer films of this invention have acceptable film curl, and that they have improved tensile strength and improved puncture resistance.

The multilayer films of the present invention may be further characterized by the fact that the first layer of very low density polyethylene and the second layer of very low density polyethylene will bond directly to the two sides of the core layer of vinylidene chloride-methyl acrylate copolymer even though said first layer and said second layer both have substantial freedom from cross-linking bonds. However, it is also within the scope of the present invention for said first layer and said second layer to comprise very low density polyethylene which contains cross-linking bonds.

DETAILED DESCRIPTION

All embodiments of the present invention comprise a coextruded multilayer film, suitable for use in packaging fresh red meat cuts and processed meats, which comprises a core layer of vinylidene chloride-methyl acrylate copolymer, a first layer comprising very low density polyethylene, and a second layer comprising very low density polyethylene, wherein the first layer and the second layer are bonded directly to the first and second surfaces of the core layer without the use of adhesive layers.

It must be emphasized at this point that our invention is directed to coextruded multilayer films, because we have discovered that high adhesion bonding of very low density polyethylene directly to the core layer of vinylidene chloride-methyl acrylate copolymer, without the use of interposed adhesive layers, can be achieved through coextrusion. This is because the coextruded multilayer film is produced by joining the several layers together while all layers are in the liquid phase. This allows the various polymers at the layer-to-layer interface of liquid to intermingle slightly so that when the liquids solidify, the layers are strongly bonded to each other.

This explains why U.S. Pat. No. 4,640,856 to Ferguson et.al. teaches that adhesive layers are required in order to bond very low density polyethylene to the vinylidene chloride copolymer. The experimental runs which produce the multilayer film samples for the Examples in this Patent, wherein the oxygen barrier layer was a copolymer of vinylidene chloride, were all produced by the extrusion coating process which is exemplified by U.S. Pat. No. 3,741,253 to Brax et.al. In this extrusion coating process, a substrate layer is first extruded to provide a tubular film which will become the inner layer of the tubular multilayer film. After this base layer has been made, a melt of the oxygen barrier layer comprising the copolymer of vinylidene chloride is extrusion coated on the outer surface of the tubular film. After this extrusion coating has solidified to provide a two layer substrate tubular film, a third layer of a melted polymer or copolymer is coated on the outer surface of the two layer tubular film to provide a three layer tubular film. Succeeding layers of other polymers or copolymers may be extruded on this three layer tubular film to the extent that tubular multilayer films containing more than three layers are desired. It is due to the fact that the succeeding polymer melts are coated upon a solid film substrate in each instance, that causes the succeeding layers to have very poor bonding when very low density polyethylene and vinylidene chloride copolymers are extrusion coated to one another. The polymer melt is unable to penetrate the solid surface of the film substrate sufficiently to allow the two layers to slightly intermingle at the layer-to-layer interface and thereby produce a strong interface bonding when the melted coating solidifies.

In all embodiments of the present invention, the core layer of oxygen barrier film comprises vinylidene chloride-methyl acrylate copolymer. The vinylidene chloride content of the copolymer should not exceed about 95 weight percent. This is because, when the vinylidene chloride content is greater than about 95 weight percent, the vinylidene chloride-methyl acrylate copolymer is generally not extrudable in presently known coextrusion systems. However, the vinylidene chloride content should not be less than about 85 weight percent of the vinylidene chloride-methyl acrylate copolymer in order to maintain the level of methyl acrylate in the copolymer at not greater than 15 weight percent, which is the maximum level of methyl acrylate currently allowed by the United States Food and Drug Administration for food contact applications.

It is within the scope of the present invention for the core layer of oxygen barrier film to comprise vinylidene chloride-methyl acrylate copolymer. It is also within the scope of the present invention for the oxygen barrier core layer to contain vinylidene chloride-methyl acrylate copolymer blended with another oxygen barrier material, such as vinylidene chloride-vinyl chloride copolymer. It should be noted, however, that multilayer films containing blends of vinylidene chloride-methyl acrylate copolymer with vinylidene chloride-vinyl chloride copolymer, and having adjacent layers of thermoplastic polymers in general, are not a part of this invention, but are a separate invention which is claimed in copending application Ser. No. 054,920 filed contemporaneously with this application in the name of J. M. Schuetz.

The vinylidene chloride-vinyl chloride copolymer, which may be blended with the vinylidene chloride-methyl acrylate copolymer, will contain at least about 65 weight percent, and not more than about 95 weight percent, of polymerized vinylidene chloride because, when the vinylidene chloride content is less than about 65 weight percent, the oxygen and moisture barrier property of the copolymer is diminished. If the vinylidene chloride content is more than 95 weight percent, the vinylidene chloride-vinyl chloride copolymer is generally not extrudable.

The vinylidene chloride-methyl acrylate copolymer and the vinylidene chloride-vinyl chloride copolymer each will preferably contain less than 5 weight percent of a plasticizer, the percentages being based on the weight of the total blend, i.e., including the copolymer and all additives such as the plasticizer, in order to maximize the barrier properties of the film. Conventional plasticizers such as dibutyl sebacate and epoxidized soybean oil may be employed therein.

All embodiments of the present invention contain a first layer comprising very low density polyethylene and a second layer comprising very low density polyethylene. Those skilled in the art recognize that this is a specific species of polyethylene. Several species of polyethylene are commercially available, and these species may be characterized as the product of a high pressure catalytic process or the product of a low pressure catalytic process.

The high pressure process produces polymers which are highly branched, with higher densities being an indication of shorter branches and high crystallinity. Such polymers are conventionally classified as low density polyethylene, commonly called "LDPE", which has a density below about 0.925 grams per cubic centimeter, and high density polyethylene, commonly called "HDPE", which has a density greater than about 0.940 grams per cubic centimeter. Polyethylenes having a density in the range of from about 0.925 to about 0.940 grams per cubic centimeter are commonly referred to as medium density polyethylene.

The ethylene may also be polymerized in the high pressure process with other monomers, such as vinyl acetate, ethyl acrylate, or acrylic acid. The copolymer with vinyl acetate is known as ethylene vinyl acetate and it is commonly referred to as "EVA".

The low pressure process produces polymers which are more linear in structure. Such polymers are commonly classified as very low density polyethylene, commonly called "VLDPE", which has a density of from about 0.860 to about 0.915 grams per cubic centimeter, and linear low density polyethylene, commonly called "LLDPE", which has a density greater than about 0.915 grams per cubic centimeter.

Very low density polyethylene and linear low density polyethylene are copolymers of ethylene with a higher alpha olefin. The higher alpha olefins which can be polymerized with ethylene to produce the low modulus linear copolymers can contain from three to eight carbon atoms. These alpha olefins should not contain any branching on any of their carbon atoms closer than two carbon atoms removed from the double bond. Suitable alpha olefins include propylene, butene-1, pentene-1, hexene-1, 4-methylpentene-1, heptene-1 and octene-1. The preferred alpha olefins are propylene, butene-1, hexene-1, 4-methylpentene-1 and octene-1.

In some instances, one or more dienes, either conjugated or non-conjugated, may have been present in the polymerization reaction mixture. Such dienes may include, for example, butadiene, 1,4-hexadiene, 1,5-hexadiene, vinyl norbornene, ethylidene norbornene and dicyclopentadiene.

The linear polyethylene produced by this low pressure catalytic copolymerization, typically has a melt index of from about 0.5 to about 2.5 decigrams per minute. When the melt index is below 0.5 decigrams per minute, the film is difficult to extrude, and resins having a melt index about 2.5 decigrams per minute are not film grade resins.

As previously noted hereinabove, those copolymers having a density in the range of from about 0.86 to about 0.915 grams per cubic centimeter are commonly referred to as a very low density polyethylene, while those having a density greater than about 0.915 grams per cubic centimeter are commonly referred to as linear low density polyethylene.

In one preferred embodiment of the present invention, the first layer of very low density polyethylene, which is bonded directly to the oxygen barrier core layer of vinylidene chloride-methyl acrylate copolymer, provides the heat sealing layer for the multilayer film. Where the film is produced by coextrusion to provide a tubular multilayer film, the first layer of very low density polyethylene will be the inner layer of the tubular film.

In another preferred embodiment of the present invention, the second layer of very low density polyethylene, which is bonded directly to the core layer of vinylidene chloride-methyl acrylate copolymer without the use of adhesives, provides the second layer of a three layer film embodiment. It has been found that using a very low density polyethylene in the second outer layer of the multilayer film provides the film with a puncture resistance which is improved over similar films containing outer layers of ethylene-vinyl acetate copolymers, and it also provides loading and shrink tunnel survival rates which are at least equal to, if not superior to, the survival rates of those films which contain ethylene vinyl acetate copolymer outer layers.

In an alternate embodiment of the present invention, however, the first layer of very low density polyethylene, which is bonded directly to the oxygen barrier core layer of vinylidene chloride-methyl acrylate copolymer, provides a second core layer which is confined between the first core layer of oxygen barrier film and a first outer layer of a heat sealable thermoplastic polymer or copolymer. The heat sealable first outer layer may comprise such films as an ionomer, an ethylene vinyl acetate copolymer, an ethylene-propylene copolymer, and the like. Also suitable is polypropylene blended with another polymer, such as polybutene-1. Thus, this embodiment contemplates a multilayer film having four layers, although more than four layers are also possible.

In another alternate embodiment of the present invention, the second layer of very low density polyethylene, which is bonded directly to the oxygen barrier first core layer of vinylidene chloride-methyl acrylate copolymer without the use of adhesives, provides a second core layer which is confined between the first core layer and a second outer layer which comprises a thermoplastic polymer or copolymer. Thus, this embodiment of the present invention also contemplates another multilayer film having four layers, although multilayer films having more than four layers are also possible.

The addition of this fourth layer as a second outer layer for the multilayer film of this invention may be undertaken when it is desired to improve the abrasion resistance of the film. This can be accomplished by providing a second outer layer comprising a thermoplastic polymer or copolymer such as an ionomer resin, a propylene-ethylene copolymer, a high density polyethylene, a linear low density polyethylene, and the like, as well as blends thereof.

In one preferred embodiment, the second outer layer (the fourth layer) comprises a blend of a high density polyethylene with a linear low density polyethylene or a very low density polyethylene. As the level of high density polyethylene in the blend of the second outer layer is increased, the abrasion resistance of the film continues to increase. However, when the level of high density polyethylene in the second outer layer blend becomes greater than about 5 weight percent, the haze value of the film becomes unacceptable for bags used in the packaging of processed meats. Additionally, when the level of high density polyethylene is increased to greater than 30 weight percent of the second outer layer blend, the shrinkage property of the film becomes unacceptable for bags used in the packaging of fresh red meats and processed meats. Thus, the amount of high density polyethylene in the blend should not exceed 30 weight percent in fresh red meat bags or 5 weight percent in processed meat bags. The high density polyethylene useful in the second outer layer has a melt index of from about 0.1 to about 1.0 decigram per minute, and a density of from about 0.94 to about 0.96 gram per cubic centimeter. Resins having a melt index below 0.1 are not extrudable, and those having a melt index above 1.0 produce films of diminished strength.

In summary then, the broadest aspect of the multilayer film of this invention contemplates a three layer film. However, it is contemplated that one or more layers may be added to the outer surface of either the first layer or the second layer of very low density polyethylene to provide a multilayer film containing four or more layers. Moreover, it is also contemplated that one or more layers may be added to the outer surface of both the first layer and the second layer of very low density polyethylene to provide a multilayer film containing five or more layers.

The coextruded thermoplastic multilayer films of this invention can be produced by known techniques. For example, the multilayer films may be prepared by coextruding the film layers through an annular die to produce a primary tube, and then biaxially stretching the multilayer tubular film in accordance with the conventional "double-bubble" technique disclosed in Pahlke U.S. Patent No. 3,456,044. Alternatively, the coextruded multilayer film may be slot cast and biaxially stretched by tentering before the resulting sheet is fabricated into bags.

When the coextruded, multilayer film of the present invention has been produced, it may be desirable to cross-link the multilayer film, although cross-linking is not required in order to achieve high adhesion bonding of the very low density polyethylene directly to the vinylidene chloride-methyl acrylate core layer without the use of adhesive layers therebetween. Cross-linking may be undertaken in order to enhance the heat sealing characteristics of the first outer layer of very low density polyethylene, which is the inner layer of the tubular film embodiments. Cross-linking may also be undertaken in order to improve the puncture resistance of the multilayer film. While chemical cross-linking is feasible, we prefer to cross-link by irradiation. Chemical cross-linking may be achieved by means such as organic peroxide cross-linking, or by the addition of a silane to the very low density polyethylene and the subsequent reaction of the modified polyethylene with a silanol condensation catalyst and water. We prefer to cross-link by irradiation, since this technique is less complicated and it entails a lower cost than the chemical cross-linking methods. Although the irradiation may be undertaken prior to the biaxial stretching step, we prefer to irradiate the multilayer film after biaxially stretching the film. The film is preferably irradiated with electrons at a dosage of from about 1 to about 5 megarads, and more preferably at a dosage of from about 2 to about 3 megarads.

In summary then, the multilayer films of the present invention may be characterized by the fact that the first layer of very low density polyethylene and the second layer of very low density polyethylene will bond directly to the two sides of the first core layer of vinylidene chloride-methyl acrylate copolymer even though said first layer and said second layer both have substantial freedom from cross-linking bonds. However, it is also within the scope of the present invention for said first layer and said second layer to comprise very low density polyethylene which contains cross-linking bonds. Those skilled in the art recognize that cross-linking, whether by irradiation or by chemical means, will cause the melt index of the cross-linked VLDPE layers to be below the melt index of the original VLDPE resins which are used respectively in the first layer of VLDPE and in the second layer of VLDPE. Thus, the term "contains cross-linking bonds" means that the melt index of the VLDPE layers is significantly lowered during the process of converting the respective resins of the two VLDPE layers into the multilayer film products of this invention. Similarly, the term "having substantial freedom from cross-linking bonds" means that the melt index of the VLDPE layers is not significantly lowered during the process of converting the respective resins of the two VLDPE layers into the multilayer film products of this invention.

In one preferred embodiment of the present invention, the coextruded multilayer film comprises a biaxially stretched thermoplastic three layer film having a total thickness of from about 1.75 mils to about 4.5 mils, and preferably from about 2.0 mils to about 3.0 mils. Films of less than about 1.75 mils thickness will generally not have the necessary puncture resistance, and films of greater than about 4.5 mils will produce bags which will be somewhat difficult to gather and clip closed or they may be difficult to heat seal closed at efficient speeds on heat sealing vacuum packaging machines. The heat sealing first outer layer of very low density polyethylene will preferably have a thickness of from about 1.1 mils to about 1.8 mils; the core layer of vinylidene chloride-methyl acrylate copolymer will preferably have a thickness of from about 0.25 mil to about 0.45 mil; and the second outer layer of very low density polyethylene will have a thickness of from about 0.35 mil to about 2.0 mils, but preferably from about 0.5 mil to about 1.0 mils.

In this three layer film embodiment, the thickness of the first outer layer is preferably within the aforementioned range in order to obtain good deal strength and acceptable film shrinkage. The thickness of the first core layer is preferably within the aforementioned range in order to provide adequate oxygen barrier without detracting from toughness properties, but the upper limit of 0.45 mil is based upon the extent of the barrier protection which is required for the intended use for the multilayer film. The thickness of the second outer layer is preferably within the aforementioned range in order to make up the total film thickness and to provide properties of abrasion resistance and puncture resistance.

As noted hereinabove, the present invention contemplates two alternate embodiments of multilayer film having four layers. The first alternate embodiment comprises a coextruded multilayer film containing a first outer layer of a heat sealable thermoplastic polymer or copolymer; a first core layer of an oxygen barrier material comprising vinylidene chloride-methyl acrylate copolymer; a second core layer comprising very low density polyethylene, confined between said first outer layer and said first core layer, and bonded directly to said first core layer without the use of adhesives; and a second outer layer comprising very low density polyethylene bonded directly to said first core layer without the use of adhesives. The second alternate embodiment comprises a coextruded multilayer film containing a first core layer of oxygen barrier material comprising vinylidene chloride-methyl acrylate copolymer; a heat sealable first outer layer comprising very low density polyethylene bonded directly to said first core layer without the use of adhesives; a second outer layer comprising a thermoplastic polymer or copolymer; and a second core layer comprising very low density polyethylene, confined between said first core layer and said second outer layer, and bonded directly to said first core layer without the use of adhesives.

In said first alternate embodiment of the present invention, the coextruded multilayer film comprises a biaxially stretched thermoplastic four layer film having a total thickness of from about 2.0 mils to about 4.5 mils. The 2.0 mils lower limit is established by the total thickness achieved in adding the lower limit of thickness for the four individual layers. As previously noted, films having a thickness greater than about 4.5 mils will produce bags which will be somewhat difficult to gather and clip closed or they may be difficult to heat seal closed at efficient speeds on heat sealing vacuum packaging machines. The heat sealing first outer layer of thermoplastic polymer or copolymer will preferably have a thickness of from about 1.1 mils to about 1.8 mils; the first core layer of vinylidene chloride-methyl acrylate copolymer will preferably have a thickness of from about 0.25 mil to about 0.45 mil; the second core layer of very low density polyethylene confined between said first outer layer and said first core layer will preferably have a thickness of from about 0.35 mil to about 2.0 mils; and the second outer layer of very low density polyethylene will preferably have a thickness of from about 0.35 mil to about 2.0 mils, but more preferably from about 0.5 mil to about 1.0 mil.

In the second alternate embodiment of the present invention, the coextruded multilayer film comprises a biaxially stretched thermoplastic four layer film having a total thickness of from about 2.0 mils to about 4.5 mils. The 2.0 mils lower limit is established by the total thickness achieved in adding the lower limit of thickness for the four individual layers. As previously noted, films having a thickness greater than about 4.5 mils will produce bags which will be somewhat difficult to gather and clip closed or they may be difficult to heat seal closed at efficient speeds on heat sealing vacuum packaging machines. The heat sealing first outer layer of very low density polyethylene will preferably have a thickness of from about 1.1 mils to about 1.8 mils; the first core layer of vinylidene chloride-methyl acrylate copolymer will preferably have a thickness of from about 0.25 mil to about 0.45 mil; the second core layer of very low density polyethylene confined between said first core layer and the second outer layer will preferably have a thickness of from about 0.5 mil to about 2.0 mils; and the second outer layer of thermoplastic polymer or copolymer will preferably have a thickness of from about 0.35 mil to about 2.0 mils, but more preferably from about 0.5 mil to about 1.0 mil.

In both alternate embodiments comprising coextruded four layer films, the thickness of the first outer layer is preferably within the aforementioned range in order to obtain good seal strength and acceptable film shrinkage. The thickness of the first core layer is preferably within the aforementioned range in order to provide adequate oxygen barrier without detracting from toughness properties, but the upper limit of 0.45 mil is based upon the extent of the barrier protection which is required for the intended use for the multilayer film. The thickness of the second core layer is preferably within the above-indicated range in order to enhance the puncture resistance of the film without being too costly. The thickness of the second outer layer is preferably within the aforementioned range in order to make up the total film thickness and to provide properties of abrasion resistance and puncture resistance.

In addition to providing good heat sealing when the film is fabricated into bags, multilayer films of the present invention have good shrink properties, good abrasion resistance and good toughness. Thus, these films have utility in many packaging applications. However, in a preferred embodiment, these films are fabricated into bags for the packaging of primal and subprimal meat cuts of fresh red meat, and for the packaging of processed meats.

Such bags may be produced from the multilayer films of this invention by any suitable method, such as by heat sealing the side and/or bottom edges. For instance, if the film of this invention is produced in the form of a tubular film, bags can be produced therefrom by heat sealing one end of a length of the tubular film, or by sealing both ends of the tube ends and then slitting one edge to form the bag mouth. If the film of this invention is made in the form of flat sheets, bags can be formed therefrom by sealing three edges of two superimposed sheets of film. When carrying out a heat sealing operation, the surfaces which are heat sealed to each other to form seams are the said first outer layers of the films of this invention. Thus, for example, when forming a bag by heat sealing one edge of a length of tubular film, the inner surface of the tube, i.e., the surface which will be heat sealed to itself, will be the said first outer layer of the film. Accordingly, the first outer layer of the film becomes the inner surface of the bag and the second outer layer of the film becomes the outer surface of the bag.

The invention is further illustrated by Examples which are presented hereinafter.

The resins which are used in making the multilayer films of the Examples are identified as follows:

| Ethylene Vinyl Acetate (EVA) | |
|---|---|
| EVA-1: | DQDA 6832 |
| | Vinyl Acetate 11 Wt. % |
| | Melt Index 0.25 dg./min. |
| | Union Carbide Corporation; |
| | Danbury, CT |
| EVA-2: | ELVAX 3135X |
| | Vinyl Acetate 12 Wt. % |
| | Melt Index 0.35 dg./min. |
| | E. I. DuPont de Nemours & Co., |
| | Inc.; Wilmington, DE |
| EVA-3: | ENRON 3507C |
| | Vinyl acetate 5 Wt. % |
| | Melt Index 0.25 dg./min. |
| | USI Chemicals Company |
| | Cincinnati, OH |
| EVA-4: | A blend of EVA-2 and EVA-3 |
| | 75 Wt. % EVA-2, 25 Wt. % EVA-3 |
| | Contains about 9 Wt. % vinyl acetate |
| Vinylidene Chloride-Vinyl Chloride Copolymer(VC-VDC) | |
| VC-VDC: | Kureha F Resin |
| | Vinyl Chloride 29 Wt. % |
| | Molecular Weight 125,000 |
| | Kureha Chemical Industry Co., Ltd. |
| | Tokyo, Japan |
| Vinylidene Chloride-Methyl Acrylate Copolymer(MA-VDC) | |
| MA-VDC: | XI 32023 |
| | Methyl Acrylate 8 Wt. % |
| | Molecular Weight 105,000 |
| | Dow Chemical Co.; Midland, MI |
| Vinylidene Chloride Copolymer Blend | |
| Blend: | Wt. % MA-VDC |
| | 25 Wt. % VC-VDC |
| Linear Low Density Polyethylene (LLDPE) | |
| LLDPE-1: | HS 7028 |
| | Melt Index 1.0 dg./min. |
| | Density 0.918 gm./cc. |
| | Ethylene-Hexene Copolymer |
| | Union Carbide Corporation; Danbury, CT |
| LLDPE-2: | Dowlex 2045 |
| | Melt Index 1.0 dg./min. |
| | Density 0.920 gm./cc. |
| | Ethylene-Octene Copolymer |
| | Dow Chemical Co.; Midland, MI |
| Very Low Density Polyethylene (VLDPE) | |
| VLDPE-1: | DFDA 1137 |
| | Melt Index 1.0 dg./min. |
| | Density 0.905 gm./cc. |
| | Ethylene-Butene Copolymer |
| | Union Carbide Corporation; Danbury, CT |
| VLDPE-2: | Dowlex 4002 |
| | Melt Index 2.5 dg./min. |
| | Density 0.912 gm./cc. |
| | Ethylene-Octene Copolymer |
| | Dow Chemical Co.; Midland, MI |
| VLDPE-3: | Dowlex 4001 |
| | Melt Index 1.0 dg./min. |
| | Density 0.912 gm./cc. |
| | Ethylene-Octene Copolymer |
| | Dow Chemical Co.; Midland, MI |

VLDPE-2 and VLDPE-3 are commonly called "ultra low density polyethylene" or "ULDPE" by the Dow Chemical Company. Since these two resins have densities which are below 0.915 gms./cc., for purposes of this invention they are very low density polyethylene. Therefore, we have identified these resins as VLDPE-2 and VLDPE-3 for purposes of clarity and consistency in the Examples which follow.

The properties of the resins and of the films produced therefrom may be determined by the following methods:

Density: ASTM D-1505—Plaque is conditioned for one hour at 100° C. to approach equilibrium crystallinity—reported as gms/cm$^3$.

Melt Index (MI): ASTM D-1238—Condition E—measured at 190° C.

Haze: ASTM D-1003, Procedure A.

Gloss: ASTM D-523, 45° Angle.

Tensile Strength and Elongation At Break: ASTM D-882, Procedure A.

Shrinkage Values: Values are obtained by measuring unrestrained shrink at 90° C. for five seconds. Four test specimens are cut from a given sample of the film to be tested. The specimens are cut to 10 cm. in the machine direction by 10 cm. in the transverse direction. Each specimen is completely immersed for 5 seconds in a 90° C. water bath. The distance between the ends of the shrunken specimen is measured. The difference in the measured distance for the shrunken specimen and the original 10 cm. is multiplied by ten to obtain the percent of shrinkage for the specimen. The shrinkage for the four specimens is averaged for the MD shrinkage value of the given film sample, and the shrinkage for the four specimens is averaged for the TD shrinkage value.

Dynamic Puncture: The dynamic puncture-impact test procedure is used to compare films for their resistance to bone puncture. It measures the energy required to puncture a test sample with a sharp triangular metal point made to simulate a sharp bone end. A Dynamic Ball Burst Tester, Model No. 13-8, available from Testing Machines, Inc., Amityville, Long Island, New York, is used, and a ⅜ inch diameter conical tip is installed on the tester probe arm for use in this test procedure. The conical tip has the configuration of a right circular cone, and the angle between the cone axis and an element of the conical surface at the vertex is about 65°. Six test specimens approximately 4 inches square are prepared, a sample is placed in the sample holder, and the pendulum is released. The puncture energy reading is recorded. The test is repeated until 6 samples have been evaluated. The results are calculated in cm-kg per mil of film thickness and are averaged.

Hot Water Puncture: Hot water puncture values are obtained by performing the hot water puncture test as follows. Water is heated to 90°±1° C. A ⅜ inch round wooden dowel is sharpened on one end to a conical point. This sharpened point has the configuration of a right circular cone, and the angle between the cone axis and an element of the conical surface at the vertex is about 60°. This sharp point is then rounded to a spherical tip of about 1/16 inch diameter. The wooden dowel is fastened to a wooden block so that the rounded point projects 1½ inches beyond the end of the wooden block. A specimen about 3 inches wide in the transverse direction (TD) and about ten inches long is cut from the test sample material. One end of the specimen is placed on the end of the wooden block opposite the pointed dowel. The specimen is wrapped around the end of the sharpened dowel and back to the wooden block on the opposite side, where it is secured. The film thickness in the area of contact with the sharpened dowel is measured in order to assure that the film specimen thickness is truly representative of the given test sample material. The specimen and pointed dowel are quickly immersed into the hot water and a timer is started. The timer is stopped when the wooden dowel point punctures the film specimen. The test procedure is repeated five more times with new 3 inch wide TD specimens from the given test sample material. The time required for penetration is recorded and then averaged for the six TD specimens.

Adhesion And Curl: Although the properties of adhesion and curl are separate and distinct properties of multilayer films, they are both determined by a single test procedure. A coextruded multilayer film in tubular form having a nominal length of about 2 feet is cut to provide a sample having a straight TD cut on one end and an arc TD cut on the other end. The two cuts simulate a straight bag mouth and an arcuate bag mouth. The film sample is inserted into a hot air circulating oven set at 120° F. After seven days at 120° F., the sample is removed from the oven and it is inspected at both the straight and arcuate ends for curl and delamination. In general, both ends of the tubular sample will exhibit the same degree of curl and delamination. Delamination is generally found or not found at the interface between the oxygen barrier core layer and the adjacent layer. The extent of delamination is reported as "adhesion", and the adhesion is categorized as being poor, fair, good or excellent. Films having an adhesion of poor and fair are unacceptable for packaging primal and subprimal meat cuts and processed meats. Curl is an indication of the ease or difficulty which will be experienced when opening bags fabricated of the multilayer film of the given sample. An outward curl is an indication that the bags will be easily opened. An inward curl is an indication of the degree of difficulty in opening a bag. Curl is categorized as slightly inward, moderately inward, tightly inward, slightly outward, moderately outward and tightly outward. Tubing samples showing a tightly inward curl are deemed unacceptable as providing bags which are too difficult to open. Tubing samples which show a moderately inward curl, a slight inward curl, or any degree of outward curl are deemed acceptable for the fabrication of bags.

The invention is now described further in the following Examples. In the Examples, all parts and percentages are by weight unless otherwise indicated.

EXAMPLE 1

This Example illustrates the production of a first set of multilayer films under conventional coextrusion operating conditions.

A first series of coextrusion runs was made in order to produce three layer films containing an oxygen barrier layer comprising the vinylidene chloride-vinyl chloride copolymer defined hereinabove as VC-VDC. The first outer layer contained ethylene vinyl acetate copolymer identified hereinabove as EVA-1, and the EVA-1 was blended in eight of ten runs with other copolymers of ethylene identifed hereinabove as LLDPE-1, VLDPE-1 and VLDPE-2. The second outer layer contained the blend of ethylene vinyl acetate copolymers which is identified hereinabove as EVA-4.

The melted resins were extruded from a multilayer annular die to produce the three layer film in a tubular form, wherein the first outer layer was the inner layer of the tubular film. The tubular film was extruded from the annular die to form a primary tube which was then biaxially stretched in accordance with a conventional "double-bubble" technique similar to that disclosed in U.S. Pat. No. 3,456,044 to Pahlke. The biaxially stretched multilayer film was flattened and then reeled for storage and sample evaluation. The film produced by these runs was not irradiated.

The composition of each multilayer film produced in these runs is set forth as Samples No. A-1 through A-10 in Table 1. Note that all runs produced films containing a core layer of VC-VDC and an outer layer of EVA-4.

The inner layer contained blends of EVA-1 with varying amounts of LLDPE-1, VLDPE-1, and VLDPE-2, except that Sample No. A-1 was 100 wt.% EVA-1 and Sample No. A-10 was 100 wt.% VLDPE-2. Sample No. A-1 is a control sample which is the equivalent of a film product which has been in commercial use for many years in the packaging of primal and subprimal meat cuts and processed meats, having been sold first by Union Carbide Corportion of Danbury, CT, and now being sold by Viskase Corporation of Chicago, IL, under the product identifications of PERFLEX® 52 Bag and PERFLEX® 62 Bag.

The films produced in this series of runs had a total thickness of 2.4 mils. The inner layer was 1.4 mils in thickness, the core layer of VC-VDC was 0.3 mils thick, and the outer layer of EVA-4 was 0.7 mils thick.

EXAMPLE 2

This Example illustrates the production of a second set of multilayer films under conventional coextrusion operating conditions. These films include one embodiment of the present invention.

A second series of coextrusion runs was made in order to produce three layer films containing an oxygen barrier layer comprising the blend of vinylidene chloride-vinyl chloride copolymer with vinylidene chloride-methyl acrylate copolymer which is defined hereinabove. The blend comprised 75 wt.% of the methyl acrylate copolymer and 25 wt.% of the vinyl chloride copolymer which are both defined hereinabove. The process utilized was the same as that set forth in Example 1.

TABLE 1

| Sample No. | Composition of Coextruded Films | | |
|---|---|---|---|
| | Inner Layer | Core Layer | Outer Layer |
| A-1 | EVA-1 | VC-VDC | EVA-4 |
| A-2 | 15% LLDPE-1 | VC-VDC | EVA-4 |
| | 85% EVA-1 | | |
| A-3 | 25% LLDPE-1 | VC-VDC | EVA-4 |
| | 75% EVA-1 | | |
| A-4 | 15% VLDPE-1 | VC-VDC | EVA-4 |
| | 85% EVA-1 | | |
| A-5 | 25% VLDPE-1 | VC-VDC | EVA-4 |
| | 75% EVA-1 | | |
| A-6 | 50% VLDPE-1 | VC-VDC | EVA-4 |
| | 50% EVA-1 | | |
| A-7 | 15% VLDPE-2 | VC-VDC | EVA-4 |
| | 85% EVA-1 | | |
| A-8 | 25% VLDPE-2 | VC-VDC | EVA-4 |
| | 75% EVA-1 | | |
| A-9 | 50% VLDPE-2 | VC-VDC | EVA-4 |
| | 50% EVA-1 | | |
| A-10 | VLDPE-2 | VC-VDC | EVA-4 |
| B-1 | 50% LLDPE-2 | Blend | 50% LLDPE-2 |
| | 50% EVA-1 | | 50% EVA-4 |
| B-2 | VLDPE-3 | Blend | VLDPE-3 |
| B-3 | EVA-1 | Blend | EVA-4 |

The coextruded biaxially stretched films were reeled for storage and sample evaluation without irradiation of the films.

The composition of each multilayer film produced in these runs is set forth as Samples No. B-1 through B-3 in Table 1. Note that these runs produced multilayer films containing an inner layer and an outer layer of the same composition in Samples No. B-1 and B-2. Sample No. B-1 had inner and outer layers of a blend containing resin LLDPE-2, which is defined hereinabove, and EVA-1 in equal amounts. Sample No. B-2 had inner and outer layers of 100% VLDPE-3, which is defined hereinabove, and this Sample illustrates one embodiment of the present invention. Sample No. B-3 was a control sample similar to Sample No. A-1 in that it was the equivalent of the prior art commercial product noted in Example 1.

The films produced in this series of runs had a total thickness of 2.4 mils. The inner layer had a thickness of 1.4 mils, the core layer was 0.3 mil thick, and the outer layer was 0.7 mil thick.

EXAMPLE 3

This example summarizes the key physical properties of the unirradiated reel stock multilayer films produced in the series of coextrusion runs defined in Examples 1 and 2, in regard to film acceptability for use in the packaging of primal and subprimal meat cuts and processed meats.

TABLE 2

| | Acceptability of Coextruded Unirradiated Multilayer Films | | | | | | | | |
|---|---|---|---|---|---|---|---|---|---|
| Sample No. | Layer Adhesion | | Film Curl | | Film Haze | | Film Gloss | | Acceptability Of The Film |
| | Rating | Accept | Type | Accept | % | Accept | % | Accept | |
| A-1 | Good | Yes | Moderate Out | Yes | 5.8 | Yes | 77 | Yes | Yes |
| A-2 | Fair | No | Tight In | No | 7.2 | No | 66 | No | No |
| A-3 | Fair | No | Tight In | No | 9.2 | No | 60 | No | No |
| A-4 | Fair | No | Moderate In | Yes | 6.2 | Yes | 72 | Yes | No |
| A-5 | Fair | No | Tight In | No | 7.5 | No | 68 | No | No |
| A-6 | Excellent | Yes | Tight In | No | 7.6 | No | 60 | No | No |
| A-7 | Poor | No | Tight In | No | 7.5 | No | 69 | No | No |
| A-8 | Poor | No | Tight In | No | 9.0 | No | 61 | No | No |
| A-9 | Poor | No | Tight In | No | 11.1 | No | 53 | No | No |
| A-10 | Poor | No | Tight In | No | 5.7 | Yes | 74 | Yes | No |
| B-1 | Good | Yes | Slight In | Yes | 15.1 | No | 41 | No | No |
| B-2 | Excellent | Yes | Moderate In | Yes | 1.9 | Yes | 87 | Yes | Yes |
| B-3 | Good | Yes | Tight Out | Yes | 2.3 | Yes | 86 | Yes | Yes |

Specimens of the unirradiated reel stock for each sample were evaluated for layer adhesion, film curl, haze and gloss in order to determine the acceptability of the various films in each of these categories. The results are presented in Table 2.

Layer adhesion is a visual evaluation of the degree of delamination, if any, found at the interface between the core layer and the inner layer. Delamination may be exhibited by actual separation of the layers at the end cuts of the film specimen, or by the appearance of blisters at the surface between the end cuts. The blisters are a sign of layer separation in the body of the film between the end cuts. Only the prior art control Samples No. A-1 and B-3, and new film Samples No. A-6, B-1 and B-2 showed acceptable adhesion.

Note that the prior art films of Samples No. A-1 and B-3, which contain inner and outer layer of EVA, showed an adhesion rating of Good, while the inventive film of Sample No. B-2, which contained inner and outer layers of VLDPE had an adhesion rating of Excellent. Thus, the film embodiment of this invention showed an adhesion rating which was improved over the adhesion rating of the prior art films. This is contrary to the teachings of Ferguson et.al. U.S. Pat. No. 4,640,856 which states that VLDPE does not adhere as well as EVA does.

The evaluation of film curl showed that only the prior art commercial type films of Samples No. A-1 and B-3 had an outward curl, which is the most desired type of curl for ease in opening the mouth of a bag made of the multilayer film. For the experimental multilayer films which were evaluated, only samples A-4, B-1 and B-2 had an acceptable curl. Sample B-1 had a slight inward curl, and Samples A-4 and B-2 had a moderate inward curl. All other samples had an unacceptable tight inward curl.

The differences in the direction of curl, inward or outward, and in the degree of the curl are caused by the differences that exist between the inner layer and the outer layer. When LLDPE or VLDP is blended into the EVA-1 of the inner layer, the balance between the inner layer and the outer layer becomes distorted and the film exhibits the unacceptable tight inward curl of Samples No. A-2, A-3 and A-5 through A-10.

Curl also has a influence on adhesion since it can impose stresses on the layers which may cause delamination. This is the probable reason why only those samples which had both acceptable adhesion and acceptable curl are Samples No. B-1 and B-2, where the inner and outer layers both had the same composition.

The data in Table 2 demonstrates that a multilayer film containing LLDPE or VLDPE in the inner layer must also have the same composition in the outer layer in order to assure that the film will have acceptable adhesion and acceptable curl.

The data in Table 2 also shows that films which contain a blend of EVA-1 with LLDPE or VLDPE exhibit unacceptable optical characteristics. The only exception is Sample No. A-4 which showed acceptable haze and acceptable gloss, but this sample had a low VLDPE content of 15 wt.% in the inner layer. Also, this sample had an unacceptable adhesion. Sample No. A-10 containing 100 wt.% VLDPE-2 in the inner layer and Sample No. B-2 containing 100 wt.% VLDPE-3 in both the inner and outer layers also had acceptable haze and acceptable gloss. (As noted hereinabove, haze value must not exceed 6.5% and gloss value must not be below 70% for a film to be acceptable.)

In order for a multilayer film to be acceptable for use in the packaging of fresh red meat cuts and processed meats, the film must be acceptable in all four categories of adhesion, curl, haze and gloss, and the data show that only three of the film samples meet this standard. They are the prior art Samples No. A-1 and B-3, and the new Sample No. B-2 which is an embodiment of our invention.

Sample No. B-2 is also noteworthy, not only for being the only new film meeting all standards for film acceptability, but also because it exhibits the best adhesion, the best curl, the best haze, and the best gloss for all of the new film samples.

The data in Table 2 also indicate that excellent adhesion and acceptable curl are obtained if the core layer is a blend of 75 wt.% MA-VDC and 25 wt.% VC-VDC with 100 wt.% VLDPE in both the inner and outer layers. This blend demonstrates that the core layer may contain a substantial quantity of VC-VDC in the MA-VDC blend without adversely effecting the superior physical characteristics of the multilayer films of this invention. A core layer of 100 wt.% MA-VDC will also give acceptable adhesion and curl with inner and outer layers of 100 wt.% VLDPE.

EXAMPLE 4

This Example illustrates that the embodiment of our invention which is represented by Sample No. B-2, not only has acceptable adhesion, curl, haze and gloss, but that it also has other properties which make it suitable for the packaging of primal and subprimal meat cuts and processed meats.

The inventive multilayer film Sample No. B-2 and the prior art multilayer film of Samples No. A-1 and B-3 were evaluated for tensile strength, elongation at break, shrinkage, hot water puncture, and dynamic puncture. The test results are given in Table 3.

TABLE 3

| | Properties of Coextruded Unirradiated Multilayer Films | | |
|---|---|---|---|
| | Sample No. A-1 | Sample No. B-2 | Sample No. B-3 |
| Tensile Strength, psi. MD/TD | 7,100/8,700 | 11,900/12,400 | 7,500/8,800 |
| Elongation @ Break, % MD/TD | 215/150 | 240/170 | 215/170 |
| Shrinkage @ 90° C., % MD/TD | 35/52 | 21/32 | 37/53 |
| Hot Water Puncture, sec. @ 90° C. | 29 | 120+ | 24 |
| Dynamic Puncture, cm.-kg./mil | 2.0 | 2.7 | 2.1 |

The inventive multilayer film Sample No. B-2 had tensile strength, hot water puncture, and dynamic puncture values which were improved over the samples of prior art film. The shrinkage values were less than the values for the prior art film, but the shrinkage remained at an acceptable level. Elongation at break was about the same for all three samples, and was acceptable.

Although certain embodiments of this invention have been described in detail, it is contemplated that modifications thereof may be made and some preferred features may be employed without others, all within the spirit and scope of the broad invention. For example, although Sample B-2 had the same very low density polyethylene on both sides of the core layer of vinylidene chloride-methyl acrylate copolymer, it is possible for two different VLDPE resins to be used, provided that their physical characteristics must not be so different that unacceptable curl or unacceptable adhesion results. Additionally, it is contemplated that the VLDPE of the first layer, or of the second layer, or of both the first and the second layers, may comprise a blend of VLDPE with one or more other polymers or copolymers, provided that such blends must not cause degradation of adhesion, curl, haze or gloss to such an extent that the multilayer film is rendered unacceptable. Further, those skilled in the art will recognize that the multilayer films of this invention may contain conventional additives such as pigments, antiblock agents, slip agents, and the like.

The present invention is now set forth with particularity in the claims which follow. As used in the claims, the term "polymer" includes homopolymers and copolymers.

The invention claimed:

1. A coextruded, thermoplastic, heat shrinkable, multilayer film wherein:
    (a) said multilayer film comprises a first layer comprising very low density polyethylene of density not greater than about 0.915 grams per cubic centimeter, a core layer comprising vinylidene chloride-methyl acrylate copolymer having a vinylidene chloride content of from about 85 to about 95 weight percent and a methyl acrylate content of from about 5 to about 15 weight percent all based on the weight of said copolymer, and a second layer comprising very low density polyethylene of density not greater than about 0.915 grams per cubic centimeter; and,
    (b) said first layer is adhered directly to one side of said core layer without adhesive material therebetween and said second layer is adhered directly to the other side of said core layer without adhesive material therebetween.

2. A multilayer film according to claim 1 wherein said first layer and said second layer are identical.

3. A multilayer film according to claim 2 wherein said density is in the range of from about 0.86 to about 0.915 grams per cubic centimeter.

4. A multilayer film according to claim 1 wherein said very low density polyethylene of said first layer and said very low density polyethylene of said second layer have a melt index in the range of from about 0.5 to about 2.5 decigrams per minute.

5. A multilayer film according to claim 1 wherein said very low density poylethylene of said first layer and said very low density polyethylene of said second layer have a density of about 0.912 grams per cubic centimeter and a melt index of about 1.0 decigrams per minute.

6. A multilayer film according to claim 1 wherein said very low density polyethylene of said first layer and said very low density polyethylene of said second layer are copolymers of ethylene and octene-1.

7. A multilayer film according to claim 1 wherein said core layer comprises vinylidene chloride-methyl acrylate copolymer blended with vinylidene chloride-vinyl chloride copolymer.

8. A multilayer film according to claim 7 wherein said blend comprises about 75 weight percent vinylidene chloride-methyl acrylate copolymer and about 25 weight percent vinylidene chloride-vinyl chloride copolymer.

9. A multilayer film according to claim 1 wherein said first layer is a second core layer confined between said first core layer of vinylidene chloride-methyl acrylate copolymer and first outer layer comprising a heat sealable thermoplastic polymer.

10. A multilayer film according to claim 9 wherein said first outer layer comprises a heat sealable thermoplastic polymer selected from the group consisting of an ionomer, an ethylene vinyl acetate copolymer, and ethylene-propylene copolymer, and a polypropylene blended with another polymer.

11. A multilayer film according to claim 1 wherein said second layer is a second core layer confined between said first core layer of vinylidene chloride-methyl acrylate copolymer and a second outer layer comprising a thermoplastic polymer.

12. A multilayer film according to claim 11 wherein said second outer layer comprises a blend of high density polyethylene with linear low density polyethylene or very low density polyethylene.

13. A multilayer film according to claim 12 wherein the amount of high density polyethylene in said blend is not greater than about 30 weight percent of the blend.

14. A multilayer film according to claim 1 wherein said film contains cross-linking bonds.

15. A multilayer film according to claim 14 wherein said film has been cross-linked by chemical means.

16. A multilayer film according to claim 14 wherein said film has been cross-linked by irradiation.

17. A multilayer film according to claim 16 wherein said film has been irradiated to a dosage level of from about 1 to about 5 megarads.

18. A multilayer film according to claim 14 wherein said first layer and said second layer are identical.

19. A multilayer film according to claim 18 wherein said density is in the range of from about 0.86 to about 0.915 grams per cubic centimeter.

20. A multilayer film according to claim 14 wherein said very low density polyethylene of said first layer and said very low density polyethylene of said second layer have a melt index in the range of from about 0.5 to about 2.5 decigrams per minute.

21. A multilayer film according to claim 14 wherein said very low density polyethylene of said first layer and said very low density polyethylene of said second layer have a density of about 0.912 grams per cubic centimeter and a melt index of about 1.0 decigrams per minute.

22. A multilayer film according to claim 14 wherein said very low density polyethylene of said first layer and said very low density polyethylene of said second layer are copolymers of ethylene and octene-1.

23. A multilayer film according to claim 14 wherein said core layer comprises vinylidene chloride-methyl acrylate copolymer blended with vinylidene chloride-vinyl chloride copolymer.

24. A multilayer film according to claim 23 wherein said blend comprises about 75 weight percent vinylidene chloride-methyl acrylate copolymer and about 25 weight percent vinylidene chloride-vinyl chloride copolymer.

25. A multilayer film according to claim 14 wherein said first layer is a second core layer confined between said first core layer of vinylidene chloride-methyl acrylate copolymer and a first outer layer comprising a heat sealable thermoplastic polymer.

26. A multilayer film according to claim 25 wherein said first outer layer comprises a heat sealable thermoplastic polymer selected from the group consisting of an ionomer, an ethylene vinyl acetate copolymer, an ethylene-propylene copolymer, and a propylene blended with another polymer.

27. A multilayer film according to claim 14 wherein said second layer is a second core layer confined between said first core layer of vinylidene chloride-methyl acrylate copolymer and a second outer layer comprising a thermoplastic polymer.

28. A multilayer film according to claim 27 wherein said second outer layer comprises a blend of high density polyethylene with linear low density polyethylene or very low density polyethylene.

29. A multilayer film according to claim 28 wherein the amount of high density polyethylene in said blend is not greater than about 30 weight percent of the blend.

30. A multilayer film according to any one of claims 1 through 20 wherein said multilayer film is in the form of a bag.

31. A coextruded, thermoplastic, heat shrinkable, multilayer film wherein:
   (a) said multilayer film comprises a first layer comprising very low density polyethylene of density not greater than about 0.915 grams per cubic centimeter, a core layer comprising vinylidene chloride-methyl acrylate copolymer having a vinylidene chloride content of from about 85 to about 95 weight percent and a methyl acrylate content of from about 5 to about 15 weight percent all based on the weight of said copolymer, and a second layer comprising very low density polyethylene of density not greater than about 0.915 grams per cubic centimeter;
   (b) said first layer is adhered directly to one side of said core layer without adhesive material therebetween and said second layer is adhered directly to the other side of said core layer without adhesive material therebetween; and
   (c) said first layer and said second layer have substantial freedom from cross-linking bonds.

32. A multilayer film according to claim 31 wherein said first layer and said second layer are identical.

33. A multilayer film according to claim 32 wherein said density is in the range of from about 0.86 to about 0.915 grams per cubic centimeter.

34. A multilayer film according to claim 31 wherein said very low density polyethylene of said first layer and said very low density polyethylene of said second layer have a melt index in the range of from about 0.5 to about 2.5 decigrams per minute.

35. A multilayer film according to claim 31 wherein said very low density polyethylene of said first layer and said very low density polyethylene of said second layer have a density of about 0.912 grams per cubic centimeter and a melt index of about 1.0 decigrams per minute.

36. A multilayer film according to claim 31 wherein said very low density polyethylene of said first layer and said very low density polyethylene of said second layer are copolymers or ethylene and octene-1.

37. A multilayer film according to claim 31 wherein said core layer comprises vinylidene chloride-methyl acrylate copolymer blended with vinylidene chloride-vinyl chloride copolymer.

38. A multilayer film according to claim 37 wherein said blend comprises about 75 weight percent vinylidene chloride-methyl acrylate copolymer and about 25 weight percent vinylidene chloride-vinyl chloride copolymer.

39. A multilayer film according to claim 31 wherein said first layer is a second core layer confined between said first core layer of vinylidene chloride-methyl acrylate copolymer and a first outer layer comprising a heat sealable thermoplastic polymer.

40. A multiplayer film according to claim 39 wherein said first outer layer comprises a heat sealable thermoplastic polymer selected from the group consisting of an ionomer, an ethylene vinyl acetate copolymer, an ethylene-propylene copolymer, and a propylene blended with another polymer.

41. A multilayer film according to claim 31 wherein said second layer is a second core layer confined between said first core layer of vinylidene chloride-methyl acrylate copolymer and a second outer layer comprising a thermoplastic polymer.

42. A multilayer film according to claim 41 wherein said second outer layer comprises a blend of high density polyethylene with linear low density polyethylene or very low density polyethylene.

43. A multilayer film according to claim 42 wherein the amount of high density polyethylene in said blend is not greater than about 30 weight percent of the blend.

44. A multilayer film according to any one of claims 31 through 43 wherein said multilayer film is in the form of a bag.

* * * * *

UNITED STATES PATENT AND TRADEMARK OFFICE
CERTIFICATE OF CORRECTION

PATENT NO. : 4,863,784

DATED : September 5, 1989

INVENTOR(S) : Stanley Lustig/Jeffrey M. Schuetz

It is certified that error appears in the above-identified patent and that said Letters Patent is hereby corrected as shown below:

In col. 9, line 12 change "about" to --above--.

In col. 9, line 35 after the word "second" insert --outer--.

In col. 11, line 68 change "deal" to --seal--.

In col. 13, line 11 change "0.5 mil" to --0.35 mil--.

In col. 14, line 24 change "XI" to --XU--.

In col. 14, line 28 before the word "Wt." insert --75--.

In col. 21, line 58 after the word "and" insert --a--.

In col. 23, line 5 change "20" to --29--.

Signed and Sealed this

Third Day of December, 1991

Attest:

HARRY F. MANBECK, JR.

*Attesting Officer*    Commissioner of Patents and Trademarks

US004863784C1

(12) REEXAMINATION CERTIFICATE (4320th)
United States Patent
Lustig et al.

(10) Number: US 4,863,784 C1
(45) Certificate Issued: *May 1, 2001

(54) MULTILAYER FILM CONTAINING VERY LOW DENSITY POLYETHYLENE

(75) Inventors: Stanley Lustig, Park Forest; Jeffrey M. Schuetz, Woodridge; Nancy M. Mack Robles, Chicago; Stephen J. Vicik, Darien, all of IL (US)

(73) Assignee: BT Commercial Corporation, Chicago, IL (US)

Reexamination Requests:
No. 90/004,780, Oct. 7, 1997
No. 90/005,054, Aug. 3, 1998

Reexamination Certificate for:
Patent No.: 4,863,784
Issued: Sep. 5, 1989
Appl. No.: 07/054,918
Filed: May 28, 1987

(*) Notice: This patent is subject to a terminal disclaimer.

Certificate of Correction issued Dec. 3, 1991.

(51) Int. Cl.⁷ ............... B32B 27/08; B32B 27/32; B65D 81/34
(52) U.S. Cl. ............... 428/218; 428/34.9; 428/349; 428/516; 428/518; 428/520; 428/910; 428/36.7; 426/127; 426/412; 426/129
(58) Field of Search ............... 428/34.9, 35.2, 428/35.4, 36.9, 36.7, 218, 515, 516, 518, 522, 523, 910, 349; 426/129, 127, 412

(56) References Cited

U.S. PATENT DOCUMENTS

| | | | |
|---|---|---|---|
| Re. 35,567 | 7/1997 | Newsome | 428/34.9 |
| 3,022,543 | 2/1962 | Baird et al. | 18/57 |
| 3,424,649 | 1/1969 | Nyberg et al. | 161/253 |
| 3,456,044 | 7/1969 | Pahlke | 264/25 |
| 3,555,604 | 1/1971 | Pahlke | 18/14 |
| 3,645,992 | 2/1972 | Elston | 260/80.78 |
| 3,682,767 | 8/1972 | Britton et al. | 161/227 |
| 3,741,253 | 6/1973 | Brax et al. | 138/137 |
| 3,821,182 | 6/1974 | Baird et al. | 260/91.7 |
| 4,011,382 | 3/1977 | Levine et al. | 526/96 |
| 4,048,428 | 9/1977 | Baird et al. | 526/334 |
| 4,105,609 | 8/1978 | Machon et al. | 260/23 |
| 4,105,842 | 8/1978 | Nicco et al. | 526/65 |
| 4,112,181 | 9/1978 | Baird et al. | 428/336 |
| 4,188,350 | 2/1980 | Vicik et al. | 525/232 |
| 4,196,240 | 4/1980 | Lustig et al. | 428/35 |
| 4,198,256 | 4/1980 | Andrews et al. | 156/229 |
| 4,207,363 | 6/1980 | Lustig et al. | 428/35 |
| 4,212,961 | 7/1980 | Kobayashi et al. | 526/151 |
| 4,277,578 | 7/1981 | Yoshimura et al. | 525/211 |
| 4,293,673 | 10/1981 | Hamer et al. | 526/88 |
| 4,302,565 | 11/1981 | Goeke et al. | 526/88 |
| 4,302,566 | 11/1981 | Karol et al. | 526/125 |
| 4,322,514 | 3/1982 | Miyoshi et al. | 526/124 |
| 4,329,388 | 5/1982 | Vicik et al. | 482/216 |
| 4,330,639 | 5/1982 | Matsuura et al. | 525/240 |
| 4,339,507 | 7/1982 | Kurtz et al. | 428/522 |
| 4,349,648 | 9/1982 | Jorgensen et al. | 526/125 |
| 4,354,997 | 10/1982 | Mizutani et al. | 264/560 |
| 4,357,376 | 11/1982 | Nattinger et al. | 428/35 |
| 4,374,753 | 2/1983 | Pullukat et al. | 252/429 |
| 4,379,117 | 4/1983 | Baird et al. | 264/514 |
| 4,390,677 | 6/1983 | Karol et al. | 526/348.6 |
| 4,399,181 | 8/1983 | Yoshimura et al. | 428/213 |
| 4,404,342 | 9/1983 | Miyoshi et al. | 526/125 |
| 4,415,718 | 11/1983 | Miyoshi et al. | 526/348.6 |
| 4,424,243 | 1/1984 | Nishimoto et al. | 428/36 |
| 4,425,268 | 1/1984 | Cooper | 524/110 |

(List continued on next page.)

FOREIGN PATENT DOCUMENTS

| | | |
|---|---|---|
| 975280 | 9/1975 | (CA) . |
| 982923 | 2/1976 | (CA) . |
| 1106099 | 7/1981 | (CA) . |
| 1197350 | 11/1985 | (CA) . |
| 1219400 | 3/1987 | (CA) . |
| 002606 | 6/1979 | (EP) . |
| 120503 | 10/1984 | (EP) . |
| 199871 | 11/1986 | (EP) . |
| 202814 | 11/1986 | (EP) . |
| 204918 | 12/1986 | (EP) . |
| 932231 | 7/1963 | (GB) . |
| 2033911 | 5/1980 | (GB) . |
| 2034337 | 6/1980 | (GB) . |

(List continued on next page.)

OTHER PUBLICATIONS

American Society for Testing and Materials, "Standard Definitions of Terms Relating to Plastics", ASTM Designation D883–88 (1996), pp. 1 and 337 (definition of "linear low density polyethylene").

American Society for Testing and Materials, "Standard Terminology Relating to Plastics", ASTM Designation D883–96, 16 pages (1996), p. 6 (definition of "linear low density polyethylene").

Du Pont Company, Product data sheets for "11F" SCLAIR polyethylene resins (Oct., 1980).

Du Pont Company, Product data sheets for "11P" and "11W" SCLAIR polyethylene resins (Oct., 1980).

Lank, H.H., et al., "The Du Pont Canada History", (Du Pont Canada, 1982), Chapter 6, "The Story of 'Sclair' Resins" (pp. 209–214).

"New Route to low–density polyethylene", *Chemical Engineering*, 86, 80–85 (Dec. 3, 1979).

(List continued on next page.)

Primary Examiner—Vivian Chen

(57) ABSTRACT

A coextruded, heat shrinkable, thermoplastic multilayer film for packaging fresh red meat cuts and processed meats. The film comprises a first layer comprising very low density polyethylene, a first core layer of vinylidene chloride-methyl acrylate copolymer, and a second layer comprising very low density polyethylene. In another embodiment the first layer is a second core layer confined between said first core layer and a first outer layer comprising a heat sealable thermoplastic polymer or copolymer. In a further embodiment the second layer is a second core layer confined between said first core layer and a second outer layer comprising a thermoplastic polymer or copolymer.

U.S. PATENT DOCUMENTS

| | | | |
|---|---|---|---|
| 4,429,079 | 1/1984 | Shibata | 428/240 |
| 4,438,238 | 3/1984 | Fukushima et al. | 525/240 |
| 4,448,792 | 5/1984 | Shirmer | 426/113 |
| 4,456,646 | 6/1984 | Nishimoto et al. | 428/216 |
| 4,457,960 | 7/1984 | Newsome | 428/34.9 |
| 4,469,752 | 9/1984 | Yoshimura et al. | 428/475.8 |
| 4,469,753 | 9/1984 | Yoshimura et al. | 428/475.8 |
| 4,486,377 | 12/1984 | Lucchesi et al. | 264/510 |
| 4,486,579 | 12/1984 | Machon et al. | 526/65 |
| 4,495,249 | 1/1985 | Ohya et al. | 428/516 |
| 4,505,969 | 3/1985 | Weiner | 428/213 |
| 4,508,842 | 4/1985 | Beran et al. | 502/112 |
| 4,525,257 | 6/1985 | Kurtz et al. | 204/159.2 |
| 4,542,886 | 9/1985 | Yoshimura et al. | 264/22 |
| 4,547,433 | 10/1985 | Ohya et al. | 428/516 |
| 4,551,380 | 11/1985 | Schoenberg | 428/218 |
| 4,594,213 | 6/1986 | Ealer | 264/564 |
| 4,597,920 | 7/1986 | Golike | 264/22 |
| 4,600,616 | 7/1986 | Ohya et al. | 428/36 |
| 4,617,241 | 10/1986 | Mueller | 428/520 |
| 4,623,581 | 11/1986 | Hert | 428/220 |
| 4,640,856 | 2/1987 | Furguson et al. | 428/36 |
| 4,643,928 | 2/1987 | Kimura et al. | 428/36 |
| 4,668,575 | 5/1987 | Schinkel et al. | 428/349 |
| 4,668,752 | 5/1987 | Tominari et al. | 526/348.2 |
| 4,671,987 | 6/1987 | Knott et al. | 264/176.1 |
| 4,701,496 | 10/1987 | Yoshimura et al. | 525/240 |
| 4,714,638 | 12/1987 | Lustig et al. | 428/35 |
| 4,755,436 | 7/1988 | Garland | 428/518 |
| 4,798,751 | 1/1989 | Schuetz | 428/34.9 |
| 4,832,897 | 5/1989 | van der Molen | 264/564 |
| 4,835,218 | 5/1989 | Yoshimura et al. | 525/98 |
| 4,857,408 | 8/1989 | Vicik | 428/474.4 |
| 4,863,769 | 9/1989 | Lustig et al. | 428/34.9 |
| 4,894,157 | 1/1990 | Tse et al. | 156/229 |
| 4,913,977 | 4/1990 | Taka et al. | 428/516 |
| 4,915,963 | 4/1990 | Lustig et al. | 426/127 |
| 4,976,898 | 12/1990 | Lustig et al. | 264/22 |
| 4,988,465 | 1/1991 | Lustig et al. | 264/290.2 |
| 4,988,783 | 1/1991 | Beran et al. | 526/129 |
| 4,997,690 | 3/1991 | Lustig et al. | 264/290.2 |
| 5,059,481 | 10/1991 | Lustig et al. | 428/39.9 |
| 5,077,109 | 12/1991 | Lustig et al. | 264/564 |
| 5,256,351 | 10/1993 | Lustig et al. | 264/22 |
| 5,256,428 | 10/1993 | Lustig et al. | 426/127 |
| 5,439,717 | 8/1995 | Lustig et al. | 428/34.9 |

FOREIGN PATENT DOCUMENTS

| | | |
|---|---|---|
| 2034723 | 6/1980 | (GB) . |
| 2066247 | 7/1981 | (GB) . |
| 2066274 | 7/1981 | (GB) . |
| 2097324 | 11/1982 | (GB) . |
| 2125417 | 3/1984 | (GB) . |
| 2131033 | 6/1984 | (GB) . |
| 2133020 | 7/1984 | (GB) . |
| 2154178 | 9/1985 | (GB) . |
| 58-37907 | 3/1983 | (JP) . |
| 62-8534 | 1/1987 | (JP) . |
| 63-45306 | 2/1987 | (JP) . |
| 64-2062 | 1/1989 | (JP) . |
| 64-2063 | 1/1989 | (JP) . |
| 64-3228 | 1/1989 | (JP) . |
| 64-10339 | 2/1989 | (JP) . |
| 2-6621 | 1/1990 | (JP) . |
| WO 94/07954 | 4/1994 | (WO) . |

OTHER PUBLICATIONS

Pilgrim, J.F. (Technical Representative for Du Pont Canada), Technical Presentation of SCLAIR Film Resin (Oct., 1978).

Rundlof, Christer (Union Carbide Corporation), Very Low Density Polyethylene presentation (1986), from the file history of Ferguson et al. U.S. Pat. No. 4,640,856, issued Feb. 3, 1987.

Smith, W.J. (Du Pont Canada Inc.), North American LLDPE Film Market Penetration in the U.S.A., paper presented on Oct. 21, 1982.

63 Federal Register 114 (p. 32646) "Interim Guidelines for Reexamination of Cases in View of In re Portola Packaging, Inc., 100 F.3d 786, 42 USPQ2d 1295 (Fed. Cir. 1997)", Jun. 1998.*

ASTM Designation: D883–90, "Standard Definitions of Terms Relating to Plastics", *1991 Annual Book of ASTM Standards,* pp. 324–326 (1991).

Baer, E., ed., "Engineering Design for Plastics", p. 2 (Reinhold Publishing Corp., 1964).

Benning, C.J., "Plastic Films for Packaging/Technology, Applications and Process Economics", pp. 135–139 (Technomic Publishing Co., Inc., 1983).

Billet, C., "New VLDPE Resins: Opportunitites and Limitatins in Replacing Elastomers and Thermoplastics", Specialty Plastics Conference '86, pp. 91, 93, 95–117 (Nov. 13–15, 1986).

Cady, L.D., et al., "Films, Polyethylene, Linear low–Density and Ultra Low–Density", *The Packaging Encyclopedia 1988,* pp. 41–42 (1988).

Cady, L.D., "Ultralow–Density Polyethylene", *Modern Plastics Encyclopedia 1988,* p. 51 (1988).

Cady, L.D., et al., "Ultra Low Density Polyethylene for Film Extrusion", *1987 Polymers, Laminations and Coatings Conference,* pp. 627–637 (1987).

Cipriani, C. and Trischman, C.A., Jr., "New Catalyst Controls LLDPE's Particle Geometry", *Chemical Engineering,* pp. 66–67 (May 17, 1982).

Cook, J.A. and Lepper, S.E., "How New PE Resins Yield Big Benefits to Molders", *Modern Plastics,* vol. 58, No. 3 (Mar., 1981).

Dow Chemical Co., The Dow Plastics brochure, "ATTANE/ Ultra Low Density Ethylene–Octene Copolymers/Performance Plus compared to LLDPE and EVA Resins in Flexible Packaging", 39 pages (May, 1989).

Dow Chemical Company, The, "Ultra–Low–Density Polyethylene Ready to Compete With EVA", *Plastics Engineering,* vol. XLIV, No. 1, p. 41 (Jan., 1988).

"Dow Commercializes New Octene Comonomer", *Chem. Mark. Rep.,* p. 36 (Dec. 7, 1987).

*Dowlex* brochure, "Linear Low and Intermediate Density Resins" (1979).

Emmerich, A., "Processing the Linear LDPE's: There are Some Differences", *Plastics Technology,* vol. 26, No. 2, pp. 33, 35, 37, 39, 41, 43, 45, 113, 115, 117 (Feb. 1980).

*Encyclopedia of Polymer Science and Engineering,* vol. 6, "Etheylene Polymers", p. 444 (date unknown).

Kamia, R.D., "Linear Low–Density PE", *Modern Plastics Encyclopedia 1989,* pp. 64–65 (1989).

Leaversuch, R.D., "Add Very Low Density PE to the List of Options in Polyolefin Resins", *Modern Plastics,* pp. 48–50 (Jul., 1992).

Machon, J.P., Some Aspects of the Ethylene Copolymerization in the High Pressure Ziegler Process, pp. 639–649 in Quirk, R.P., et al., eds., "Transition Metal Catalyzed Polymerizations/Alkenes and Dienes/Part B" (11th Midland Macromolecular Meeting, 1981).

Mitchell, E.B. and Neel, R.B., Comparative Evaluation of Ethylene Vinyl Acetate Copolymers, Ionomers, and Ultra Low Density Polyethylene in Co–Extruded Structures, *Journal of Plastic Film and Sheeting*, vol. 4, No. 2, pp. 94–103 (Apr. 1988).

"Stronger, Tougher Polyethylene", *Packaging*, p. 79 (Jan., 1988).

Tominari, K., Special Applications and Markets for Ethylene Alpha–Olefin Copolymers in Japan, Specialty Plastics Conference '86, pp. 301, 305–335 (Nov. 13–15, 1986).

"Ultralow Density Polyethylenes: A Second U.S. Source Emerges", *Modern Plastics*, "Plastiscope" column, pp. 21–22 (Dec., 1986).

"Union Carbide", *Chemical Engineering*, "Currents" column, p. 42 (Oct. 15, 1984).

"VLDPE—a new class of polyethylene", *Plastics and Rubber International*, vol. 11, No. 2, pp. 34–36 (Apr., 1986).

Alamo, R., et al., "Thermodynamics and Structural Properties of Copolymers of Ethylene," *J. Phys. Chem.*, vol. 88. pp. 6587–6595 (American Chemical Society, 1984).

Cady, L.D., "Ultra Low–Density Polyethylene", *Modern Plastics Encyclopedia*, 1989, p. 66 (Oct., 1989).

"Cast Film", 12 pages, (DSM), 12 pages, undated document obtained from the file history of U.S. Appln. Ser. No. 07/648,480 (Quacquarella).

Chriswell, L.I., "Modern Processes for the Manufacture of Polyethylene and Polypropylene", *Chemical Engineering Progress*, vol. 79, pp. 84–92 (Apr., 1993).

"DSM Polymers International Stamylex Film Grades", 10 pages, undated document obtained from the file history of U.S. Appln. Ser. No. 07/648,480 (Quacquarella).

Hunter, B.K., et al., "The Preparation and Characterization of Homogeneous Copolymers of Ethylene and 1–Alkenes", *Journal of Polymer Science: Polymer Chemistry Edition*, vol. 22, pp. 1383–1392 (John Wiley & Sons, Inc., 1984).

"Introducing 'Very Low Density PE'", *Plastics Technology*, p. 113 (Sep., 1984).

Kurtz, S. J., "VLDPE: A Breakthrough in Flexible Linear Polyethylene", ANTEC '85, Conference Proceedings for the Society of Plastics Engineers, Inc. 43$^{rd}$ Annual Technical Conference, pp. 463–466 (Apr. 29–May 2, 1985).

Mitsui Petrochemical Industries, Ltd., *Ethylene/Alpha–Olefin Copolymer TAFMER A/P*, 11 pages (Undated, Believed to have been received Dec. 1990).

Mitsui Petrochemical Industries, Ltd., Resin Modifiers TAFMER, 20 pages (Undated, Believed to have been received Dec. 1990).

"New Family of Resins Hits Market", *The Journal of Commerce*, p. 22B (Sep., 1984).

"Now It's Very–Low–Density Polyethylene", *Chemical Week*, p. 66 (Sep., 1984).

"Polyethylene, Linear Low–Density", *Package Engineering*, vol. 28, No. 4, pp. 76–78 (Mar., 1983) (Alternate Title—The Packaging Encyclopedia, 1983).

"Polyethylene Producers Face Tough Times", *European Chemical News*, pp. 13–14 (Dec., 1985).

Schurzky, K.G., "Design Parameters for LLDPE Film Resin Selection", 1984 *Polymers, Laminations and Coatings Conference*, Book 1, pp. 7–10 (Proceedings of the Technical Association of the Pulp and Paper Industry (TAPPI).

Shigemoto, H., "Easy Feelable Lid Material", *Proceedings of Futur–Pak '91 Ninth International Ryder Conference on Food Packaging Innovations*, pp. 293–316 (Oct. 2–4, 1991).

"Something New in Polyethylene: Linear Low–Density PE", *Plastics World*, p. 86 (Dec., 1979).

"UC Researchers Smash 0.915 PE Density Mark", *Plastics World*, pp. 8–9 (Oct., 1984).

ECN Special Report, "Linear Low–Density Polyethylene Set to Capture Large Share of Plastics Market", European Chemical News New Technology Supplement, pp. 42, 47 (Dec. 22, 1980).

Kurtz, S.J., "VLDPE Plugs a Gap in PE's Density Spectrum", *Plastics Engineering*, pp. 59–62 (Sep., 1985).

"Polyethylene/Introduction to Linear Polyethylene", *Modern Plastics Encyclopedia 1989*, pp. 63–64 (1989).

Indirect Food Additives, 48 Fed. Reg. 38604 (FDA Final Rule, Aug. 25, 1983).

"Can VLDPE Outperform EVA, Other Copolymers?," Plastics News, Oct. 1984, pp. 12, 14.

"Ultralow Density PE's Are Tough, Flexible, Versatile," Plastics World, Oct. 1984, p. 96.

"New Kind of Polyethylene Combines Flexibility, Toughness, Heat Resistance," Plastics Technology, Oct. 1984, pp. 13, 15.

* cited by examiner

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, line 55 to column 8, line 2:

It is within the scope of the present invention for the core layer of oxygen barrier film to comprise vinylidene chloride-methyl acrylate copolymer. It is also within the scope of the present invention for the oxygen barrier core layer to contain vinylidene chloride-methyl acrylate copolymer blended with another oxygen barrier material, such as vinylidene chloride-vinyl chloride copolymer. It should be noted, however, that multilayer films containing blends of vinylidene chloride-methyl acrylate copolymer with vinylidene chloride-vinyl chloride copolymer, and having adjacent layers of thermoplastic polymers in general, are not a part of this invention, but are a separate invention which is claimed in copending application Ser. No. 054,920 filed contemporaneously with this application in the name of J. M. Schuetz, *now U.S. Pat. No. 4,798,751, issued Jan. 17, 1989*.

AS A RESULT OF REEXAMINATION, IT HAS BEEN DETERMINED THAT:

The patentability of claims 1–44 is confirmed.

\* \* \* \* \*